Feb. 26, 1924.  A. E. O. MUNSELL  1,484,795
COLOR PIANO
Filed March 24, 1923    2 Sheets-Sheet 1
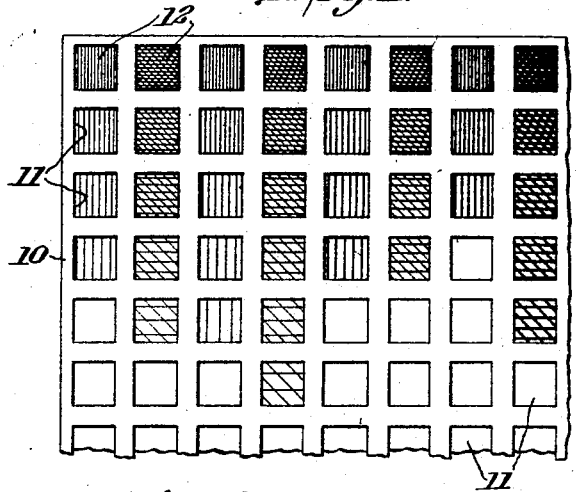
Fig.1.
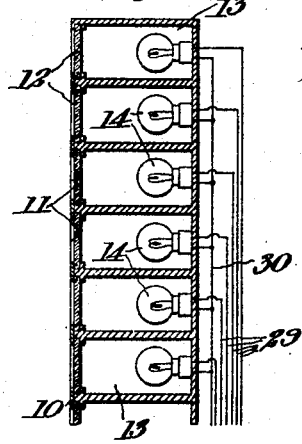
Fig.2.
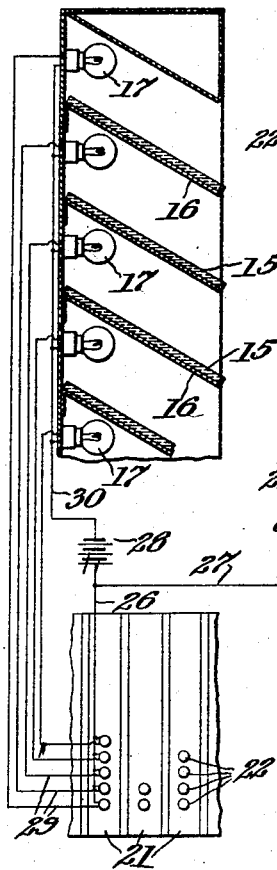
Fig.3.
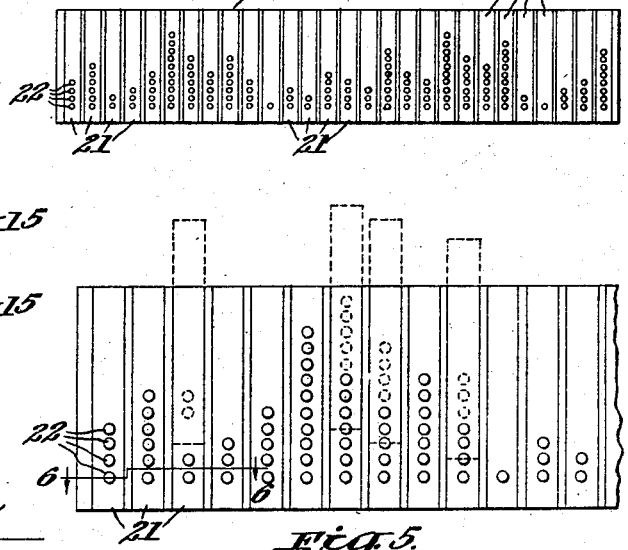
Fig.4.
Fig.5.
Inventor:
Alexander E. O. Munsell,
By Byrnes, Townsend & Brickenstein
Attorneys Feb. 26, 1924.  A. E. O. MUNSELL  1,484,795
COLOR PIANO
Filed March 24, 1923   2 Sheets-Sheet 2
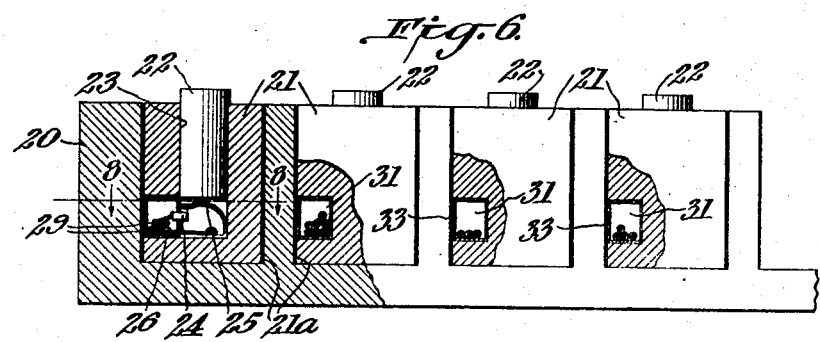
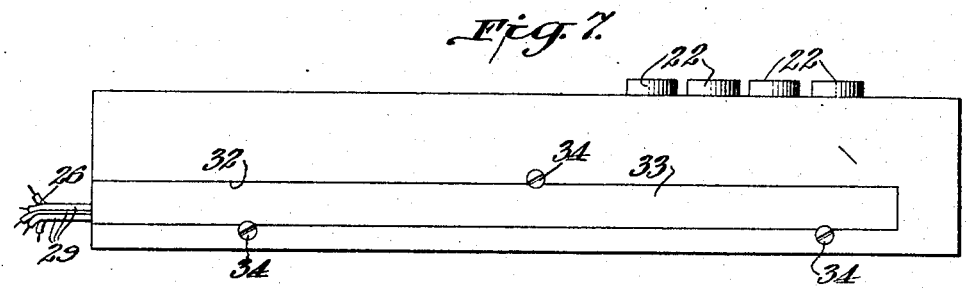
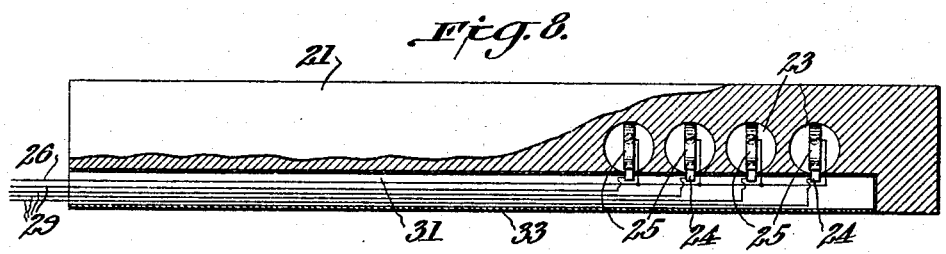
Inventor:
Alexander E. O. Munsell,
By Byrnes Townsend & Brickenstein
Attorneys Patented Feb. 26, 1924.

1,484,795

UNITED STATES PATENT OFFICE.

ALEXANDER E. O. MUNSELL, OF NEW YORK, N. Y.

COLOR PIANO.

Application filed March 24, 1923. Serial No. 627,506.

*To all whom it may concern:*

Be it known that I, ALEXANDER E. O. MUNSELL, a citizen of the United States, residing at New York, in the county of New York and State of New York, have invented certain new and useful Improvements in Color Pianos, of which the following is a specification.

This invention relates generally to apparatus for facilitating the comparison of colors.

Various devices have been proposed for comparative color studies, but their scope is usually limited to small groups of colors. For color comparison and color study the intermediate shades or tints are just as important as the pure pigments and their principal derivatives.

In accordance with the Munsell system of classification described in the patent to Munsell No. 824,374 each color has three characteristics: hue, chroma and value. The hue determines dominant wave length i. e. its approximate position in the spectrum of sunlight. The chroma indicates the purity of the wave length. The value signifies the total reflection of white light. The number of distinct colors that can be formed or are conceivable is very large.

It is the general object of the invention to provide an apparatus for selectively exhibiting any single color or group of colors.

It is a more specific invention to provide an apparatus for rapidly and directly bringing before an observer any desired color or group of colors.

The most specific object is an apparatus which in analogy to the piano may be called a color piano.

For a full understanding of the invention and the principles of operation on which it is based, I refer to the accompanying drawings in which—

Fig. 1 is an elevation of a color board;

Fig. 2 is a fragmentary section therethrough;

Fig. 3 is a fragmentary section through a modification thereof;

Fig. 4 is a plan view of a key board embodying the invention;

Fig. 5 is a fragmentary plan view of a keyboard according to Fig. 4, but on a larger scale;

Fig. 6 is a fragmentary cross-section through the key board;

Fig. 7 is a side view of key; and

Fig. 8 is a sectional view on line 18—8, Fig. 6.

In Figs. 1 and 2, 10 represents a board containing a large number of openings 11 which are occupied by colored glass panes 12. Behind the board 10 are as many compartments 13 as there are panes and each compartment contains an electric light bulb 14. The electric wires for lighting the lamps may be separately controlled so that each bulb or any group of bulbs may be energized at will, as will be more fully pointed out. In practice I prefer to apply means for diffusing the light which may be accomplished, as is well understood by applying a thin sheet of white paper or a ground glass screen behind the colored panes or using a diffusing light bulb, as is well understood. As an alternative the glass panes may consist of ground glass and the bulbs may be colored. Instead of using colored bulbs or colored glass panes, colored paper may be pasted on the glass panes. In either case it is advisable to use a light diffusing medium to thoroughly diffuse the light to make the light emission to the observer uniform.

Instead of transmitting light through glass panes as shown in Figs. 1 and 2, I may cause light to be reflected from colored surfaces. To this end I may form the compartments with inclined bottoms and tops, the angle of inclination being preferably 45° relatively to the horizontal or vertical. The bottoms may be covered by color samples 15 and the top may be provided with reflecting surfaces 16. The arrangement of the light bulbs 17 may be the same as in Figs. 1 and 2. The light from the bulbs 17 falls on the color sample and is reflected therefrom through the openings 18 to the observer. By using reflecting surfaces 16, the light distribution over the color samples 15, is more substantially uniform and the diffuse reflection from the color samples provides a uniform light emission.

So far as the production of the desired color effects is concerned there is considerable latitude within the scope of the invention. I contemplate the use of any means by which all conceivable color effects may be separately exhibited from a color board or frame.

The principal point of novelty is a means for selectively exhibiting any plurality of colors in a very short time.

In analogy to the key board of a piano I propose the use of a key board or a series of such key boards. As generally indicated in Fig. 4, a keyboard 20 may contain a plurality of elements 21 which are slidably disposed in channels 21$^a$. Each element 21 contains a plurality of small electric push button switches 22.

As indicated in Fig. 6 the buttons are loosely mounted in bores 23 of the element 21. At the bottom of the bore is a contact piece 24 and a contact spring 25. When the push button is depressed it bears upon the spring 25 and forces the latter into contact with the contact piece 24. When the pressure upon the button is released, the spring will return to its normal position thereby breaking contact with the contact piece 24 and lifting the push button to its normal position.

The springs are connected to a common conductor 26 and the conductors 26 of all the keys are connected to a common bus-bar 27 which leads to one terminal of an electric source which for the sake of convenience is indicated as a battery 28.

The contact pieces 24 are separately connected to individual wires 29 which lead to the individual light bulbs on the color board. From all light bulbs a common return 30 leads back to the other terminal of the source 28. By depressing any one button, current passes from the battery through the connection established by the push button and through the particular wire 29 to one particular light bulb and back to the battery. The mode of connection is merely illustrative and may be changed in various ways as is well understood.

The important feature is any arrangement by which any desired color may be quickly exhibited and by which any plurality of colors may be quickly exhibited for comparison. The relative disposition of the colors on the board and of the connections on the key board is largely a matter of choice.

For the sake of convenience and in accordance with the disclosure of the patent to A. H. Munsell No. 824,374, I have divided the colors according to hue into ten principal groups: Red (R), yellow-red (YR), yellow (Y), green-yellow (GY), green (G), blue-green (BG), blue (B), purple-blue (PB), purple (P), and red-purple (RP).

It is particularly advantageous to have complementary colors in juxtaposition because from the standpoint of color harmony complementary colors blend better than other colors and by having them grouped closely together, a more reliable comparison is afforded. For this reason it may be desirable to place opposite hues adjacent each other. Thus on the board all the colors of one principal hue may be placed adjacent the group containing all colors of the opposite hue.

The colors may be arranged according to their order in the spectrum or in any other orderly fashion and the elements 21 may be likewise arranged.

The colors in each principal group are subdivided according to value and chroma.

It has been found sufficient and practical so far to subdivide chroma into no more than ten degrees and value into seven degrees in order to cover all distinguishable color sensations obtainable by the available pigments, in contradistinction to white, black and neutral gray.

The colors on the board may thus be graduated in vertical rows according to chroma and in horizontal rows according to value or vice versa. The rows may alternately bear colors of opposite hue so that complementary colors of like chroma and like value may be directly adjacent each other.

The elements 21 are slidable in the channels 21$^a$ as indicated in Fig. 5 so that the button of one element 21 may be brought into juxtaposition to any of the buttons of another element 21 or generally into alinement with certain buttons of other elements 21.

The elements 21 may be disposed on a single key board or distributed over a plurality of key boards in superposition as desired. In any case the manipulation of the elements 21 and separate push buttons for selectively exhibiting colors, simultaneously or successively is rapid.

The practical utility of the apparatus lies in the ease and rapidity of exhibition of all available colors for comparison, to artists, commercial artists and color composers and also for educational purposes.

The apparatus may be operated in the dark so as to make all colors not illuminated invisible, in daylight or subdued light, as desired.

In the foregoing, for the sake of simplicity, only fragments of the color board and of the key board have been illustrated. The mode of connection, however, is the same throughout, and what applies to one part applies to the whole construction. Fig. 3 is thus representative of all the connections between the color board and the key board.

The detail arrangement of the electric connections is of no particular importance and may be modified in various ways as is well understood. The arrangement shown in Figs. 6, 7 and 8, however, in which the wires 26 and 29 are contained in a trough 31 which in turn may be placed into and removed from a corresponding channel 32 in the side of the element 21 is simple and expeditious. The cover 33 of a trough may be separately secured by screws 34 or the like.

In the claims the term "push button" is intended to mean every kind of element adapted to be pressed to establish a current flow in a circuit.

I claim:—

1. The combination of a color board containing color samples graduated according to hue, value and chroma, electric light bulbs for individually illuminating the color samples and means for controlling the illumination, said means including a key board containing a plurality of parallel rows of switches, a source of electricity and connections for establishing a plurality of circuits including each the source, a switch and a bulb.

2. The combination of a color board containing samples differing as to three characteristics of hue, chroma or value and means for selectively illuminating said samples, said means including a plurality of parallel rows of switches, a source of electricity, an incandescent bulb for each sample and separate circuits each including one of the switches and one of the bulbs.

3. Arrangement according to claim 2 in which all samples controlled by switches in alignment across the series of rows represent an orderly color sequence according to said three characteristics.

4. Arrangement according to claim 2 in which the samples controlled by successively adjacent rows represent an orderly color sequence according to said three characteristics.

5. Arrangement according to claim 2 in which the samples controlled by different rows represent different hues.

6. Arrangement according to claim 5 in which complementary hues are displayed by pairs of adjacent rows of samples on the color board and are controlled by pairs of adjacent rows of switches.

7. Arrangement according to claim 2 in which the samples controlled by the switches of each row of switches represent an orderly color sequence according to said three characteristics.

8. Arrangement according to claim 2 in which each row of switches is mounted upon an element slidable in the direction of the row.

In testimony whereof, I affix my signature.

ALEXANDER E. O. MUNSELL.